United States Patent [19]

Nishimura et al.

[11] Patent Number: 5,094,078
[45] Date of Patent: Mar. 10, 1992

[54] HYDRAULIC TRANSMISSION FOR MOTOR VEHICLE

[75] Inventors: Sadanori Nishimura; Kichiji Misawa; Tomoaki Ishikawa; Masae Takamizawa, all of Saitama, Japan

[73] Assignee: Honda Giken Kogyo Kabushiki Kaisha, Tokyo, Japan

[21] Appl. No.: 559,896

[22] Filed: Jul. 30, 1990

[30] Foreign Application Priority Data

Jul. 28, 1989 [JP] Japan .................................. 1-88632
Jul. 28, 1989 [JP] Japan .................................. 1-196225

[51] Int. Cl.$^5$ ............................................. F16D 39/00
[52] U.S. Cl. ..................................... 60/487; 180/19.3
[58] Field of Search ................. 60/468, 487, 494, 489, 60/433; 91/505; 417/440; 92/12.2; 180/19.1, 19.3, 242, 302, 305

[56] References Cited

U.S. PATENT DOCUMENTS

| | | | |
|---|---|---|---|
| 3,680,312 | 8/1972 | Forster ................................ | 60/489 |
| 4,211,079 | 7/1980 | Saele et al. ......................... | 60/433 |
| 4,856,264 | 8/1989 | Nishimura et al. .................. | 60/487 |
| 4,860,540 | 8/1989 | Hayashi et al. ..................... | 60/487 |
| 4,899,542 | 2/1990 | Iino ..................................... | 60/487 |
| 4,905,472 | 3/1990 | Okada ................................. | 60/487 |
| 4,907,408 | 3/1990 | Barker ................................ | 60/489 |

FOREIGN PATENT DOCUMENTS 63-191121 12/1988 Japan .
63-301133 12/1988 Japan .
1202541 8/1989 Japan .

Primary Examiner—Edward K. Look
Assistant Examiner—Hoang Neuyen
Attorney, Agent, or Firm—Irving M. Weiner; Joseph P. Carrier; Pamela S. Burt

[57] ABSTRACT

A continuously variable hydraulic transmission operatively interconnects a transmission mechanism and a clutch mechanism. The hydraulic transmission includes an oil pump having an inlet port and an outlet port and a transmission ratio control member such as a swash plate which is displaceable for varying the transmission ratio between a higher-speed position, a lower-speed position, and a neutral position, an oil motor having an inlet port and an outlet port and drivable by the oil pump, a first oil passage hydraulically interconnecting the outlet port of the oil pump and the inlet port of the oil motor, a second oil passage hydraulically interconnecting the inlet port of the oil pump and the outlet port of the oil motor, a housing accommodating the oil pump, the oil motor, the first oil passage, and the second oil passage, and an oil passage control unit for selectively bringing the first oil passage into and out of hydraulic communication with the second oil passage. The oil passage control unit is fully accommodated in the housing and actuatable by the transmission ratio control member to bring the first and second oil passages into hydraulic communication with each other only when the transmission ratio control member is near the neutral position.

6 Claims, 14 Drawing Sheets

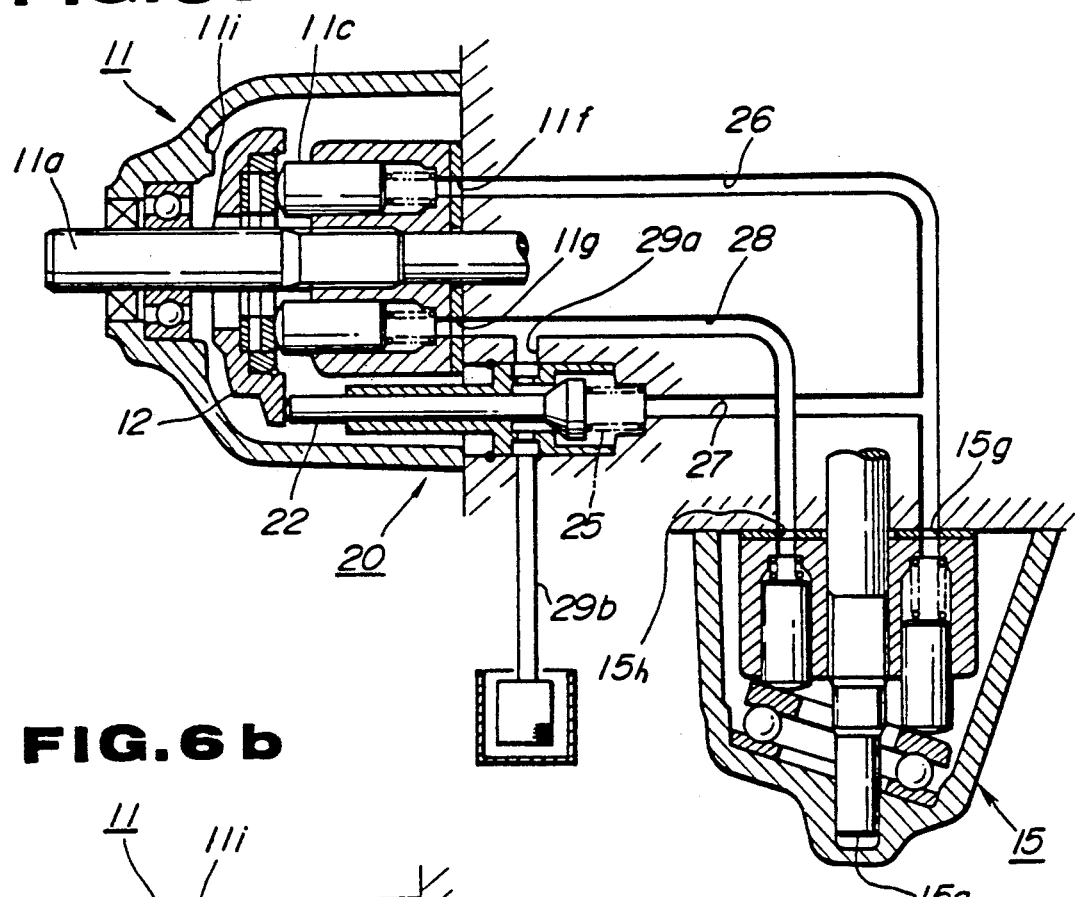
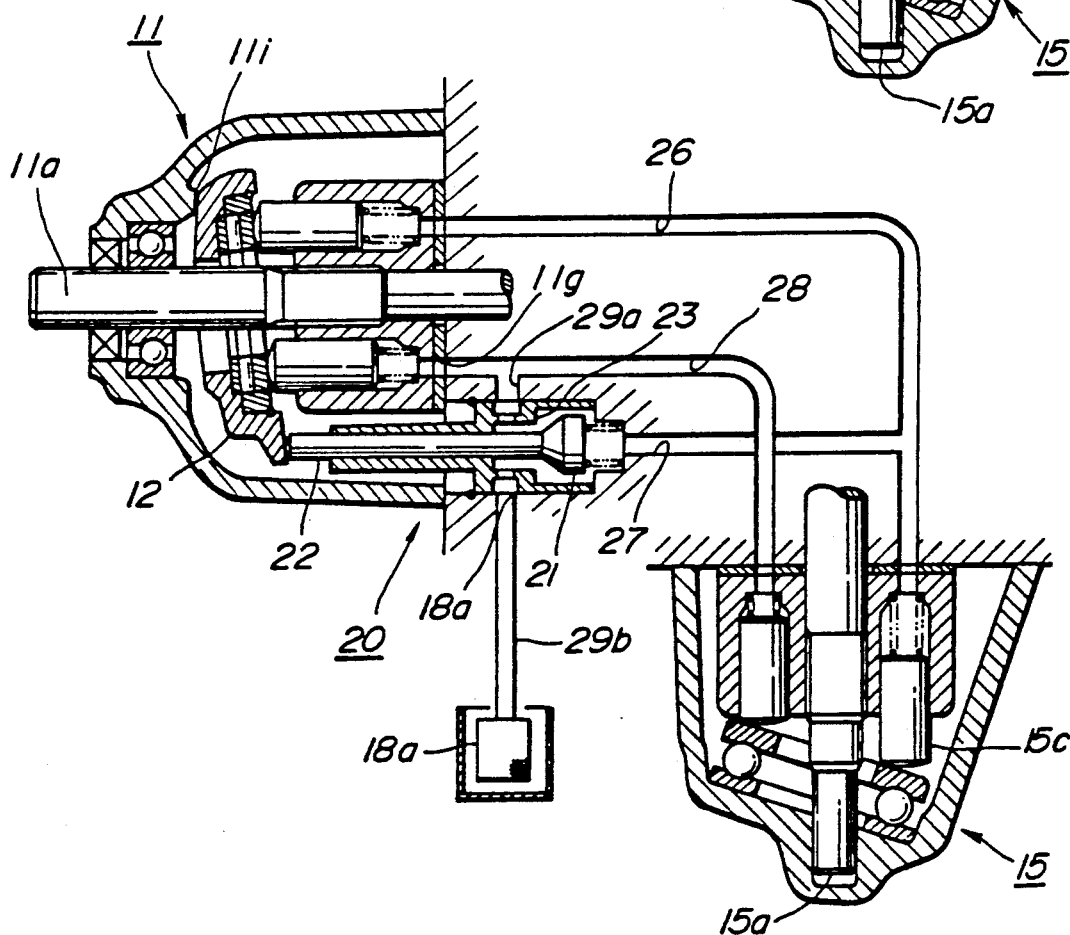

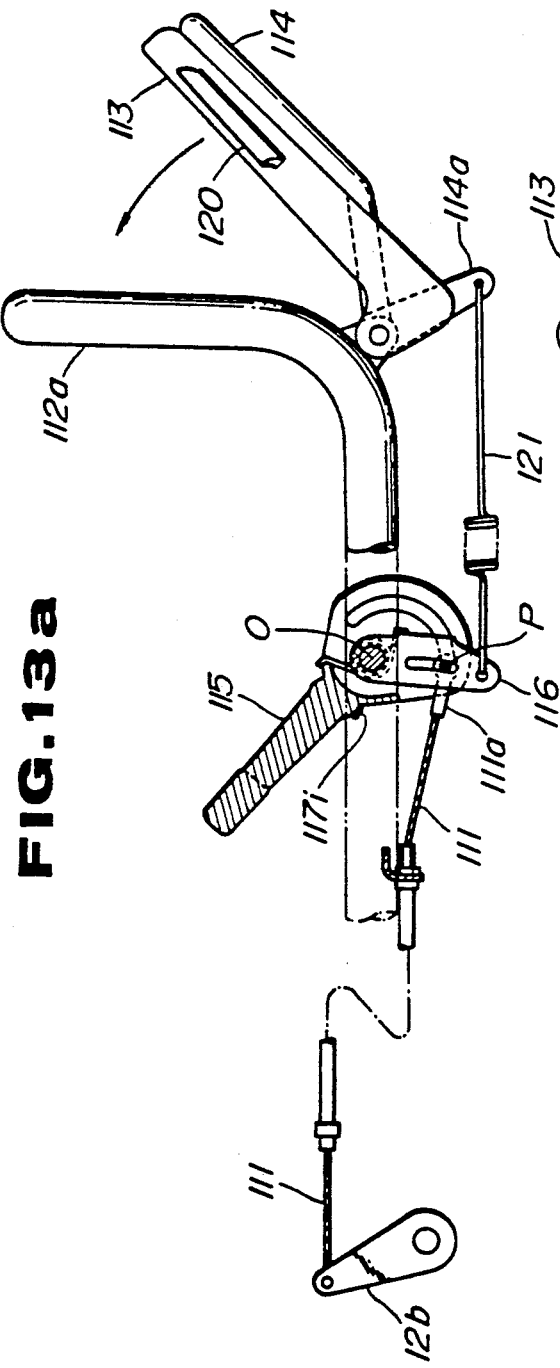
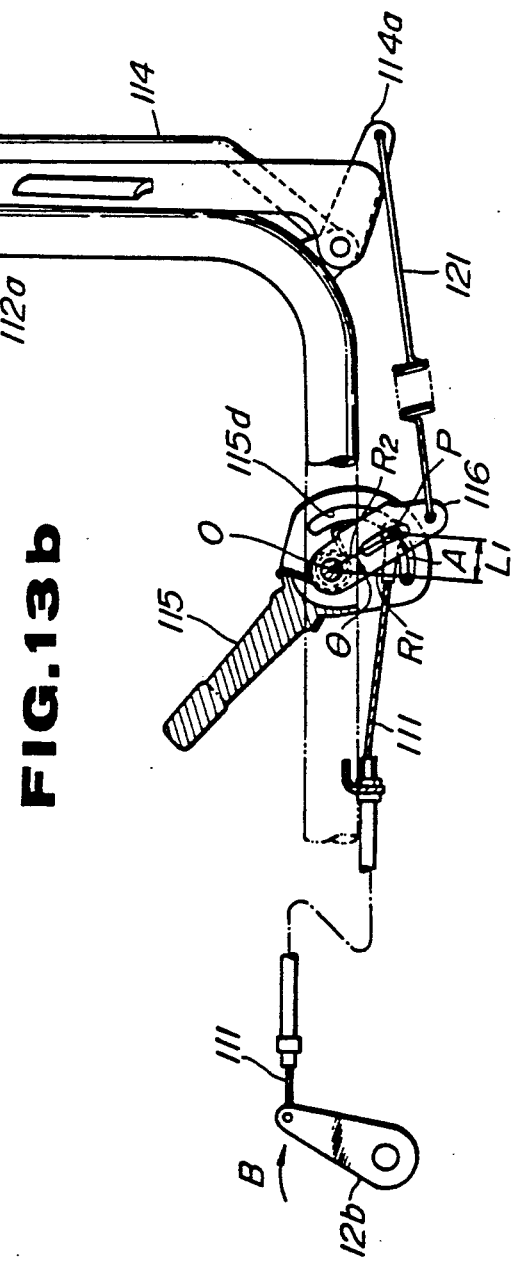
FIG. 13a
FIG. 13b

HYDRAULIC TRANSMISSION FOR MOTOR VEHICLE

BACKGROUND OF THE INVENTION

1. Field of the Invention:

The present invention relates to a continuously variable hydraulic transmission for use on a motor vehicle and a control lever assembly for controlling such a continuously variable hydraulic transmission.

2. Description of the Relevant Art:

Some motor vehicles such as power-propelled lawn mowers, cultivators, or snowplows incorporate a hydraulic transmission which includes an oil pump and an oil motor. The rotative power of the output of the engine on the motor vehicle is transmitted to drive wheels after it is changed in speed by the hydraulic transmission. Such hydraulic transmissions are disclosed in Japanese Laid-Open Patent Publication No. 63(1988)-301133 and Japanese Laid-Open Utility Model Publication No. 63(1988)-191121, for example.

The hydraulic transmission disclosed in the former publication has a directional control valve disposed in an oil passage. The directional control valve brings into fluid communication an oil passage which interconnects the outlet port of an oil pump and the inlet port of an oil motor and an oil passage which interconnects the inlet port of the oil pump and the outlet port of the oil motor, so that the oil motor is freely rotatable. Regardless of whether the oil pump produces an oil pressure or not, the drive wheels coupled to the oil motor are freely rotatable, allowing the operator of the motor vehicle to manually move the motor vehicle freely forwardly or rearwardly.

The directional control valve is connected to a clutch lever by a wire which is different from a wire interconnecting a transmission swash plate and a transmission shift lever. Since the joint between the directional control valve and the connecting wire is exposed out of a casing, a dust cover or the like must be used to prevent foreign matter such as grass clippings or dust from entering the casing. If the clutch lever were gripped while the transmission shift lever is shifted in a high-speed position when the motor vehicle is started, the motor vehicle could not be started smoothly. Therefore, the operator is required to operate the clutch lever after the transmission shift lever is shifted into a low-speed position.

The latter publication shows a power-propelled lawn mower in which various control levers are attached to a handle which extends rearwardly and upwardly from the vehicle body. Normally, the operator operates a transmission shift lever and a clutch lever which can make drive wheels freely rotatable.

The transmission shift lever and the clutch lever are independently connected to the hydraulic transmission by wires which extend under tension along the handle. Since there are plural wires employed, however, the mechanism associated with the wires is complex. There has been an attempt to employ single wire which would control the transmission shift wire and the clutch wire. However, it would be difficult to employ a single wire because the clutch lever swings through a constant stroke whereas the transmission shift lever is tilted through an angle that varies depending on a desired transmission or speed-reduction ratio.

SUMMARY OF THE INVENTION

A hydraulic transmission according to the present invention has an oil passage control means for selectively bringing two oil passages into and out of hydraulic communication with each other, the oil passages interconnecting an oil pump and an oil motor. The oil passage control means is fully accommodated in a housing of the hydraulic transmission and is actuatable only when a transmission ratio control member of the hydraulic transmission is near a neutral position thereof.

The oil passage control means comprises a directional control valve which is engaged and operated by a swash plate of the oil pump when the swash plate is tilted into the neutral position thereof. When a motor vehicle which incorporates the hydraulic transmission is started, the swash plate is tilted in one direction and the directional control valve is closed. When the operator releases a clutch lever, the swash plate is tilted in a direction opposite to said one direction, and one end of the swash plate pushes a rod of the directional control valve, thus opening the directional control valve. The two oil passages which interconnect the oil pump and the oil motor are not held in communication with each other through the directional control valve. The output shaft of the oil motor is now freely rotatable, allowing the motor vehicle to be manually moved.

The transmission radio of the hydraulic transmission is established by actuation of a transmission shift lever, and the rotative power from the engine on the motor vehicle is selectively transmittable through actuation of a clutch lever. The transmission shift lever and the clutch lever are operatively connected to each other.

The transmission shift lever is angularly movably mounted on a vehicle body and has a curved groove defined therein. A coupling lever arm having a guide groove is coaxially and angularly movably connected to the transmission shift lever. A coupling pin is slidably fitted in the curved groove in the transmission shift lever and the guide groove in the coupling lever arm. The coupling pin is connected to an arm fixed to the swash plate through a wire. The coupling lever arm is coupled by a tension spring to the clutch lever which is angularly movably mounted with respect to the vehicle body. The curved groove in the transmission shift lever is shaped such that the distance to the curved groove from the axis about which the transmission shift lever is angularly movable is progressively reduced from one end to the other thereof. The coupling pin is movable in and along the curved groove and the guide groove, so that the stroke by which the wire moves varies depending on the angular position in which the transmission shift lever is tilted.

The above and further objects, details and advantages of the present invention will become apparent from the following detailed description of preferred embodiments thereof, when read in conjunction with the accompanying drawings.

BRIEF DESCRIPTION OF THE DRAWINGS

FIGS. 6a and 6b are cross-sectional views showing the manner in which a directional control valve in the hydraulic circuit operates;

DETAILED DESCRIPTION OF THE PREFERRED EMBODIMENTS

Figure 1:
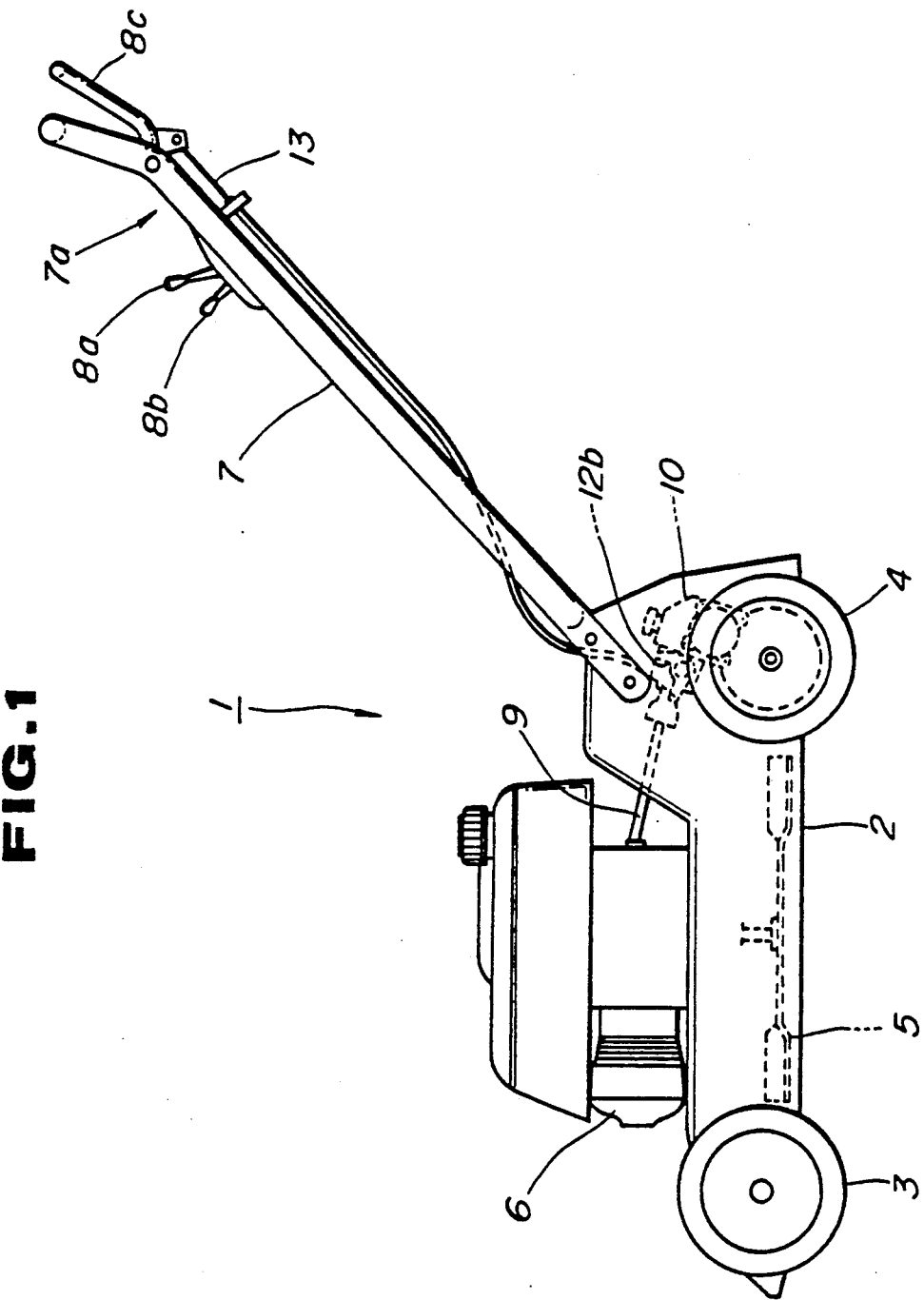
FIG. 1 is a side elevational view of a power-propelled lawn mower incorporating a hydraulic transmission according to an embodiment of the present invention.

As shown in FIG. 1, a power-propelled lawn mower 1 has front wheels 3 and rear wheels 4 which are rotatably mounted on front and rear ends, respectively, of a lawn mower body 2, and an engine 6 and a grass cutter 5 which are supported respectively on and in the lawn mower body 2 and disposed between the front and rear wheels 3, 4.

A handle 7 extends obliquely upwardly from the rear end of the lawn mower body 2, and has an upper portion 7a on which there are angularly movably mounted a transmission shift lever 8a, a throttle lever 8b, and a clutch lever 8c. The power-propelled lawn mower 1 also has a hydraulic transmission 10 disposed in the lawn mower body 2 and interposed between the rear wheels 4.

Figure 2:
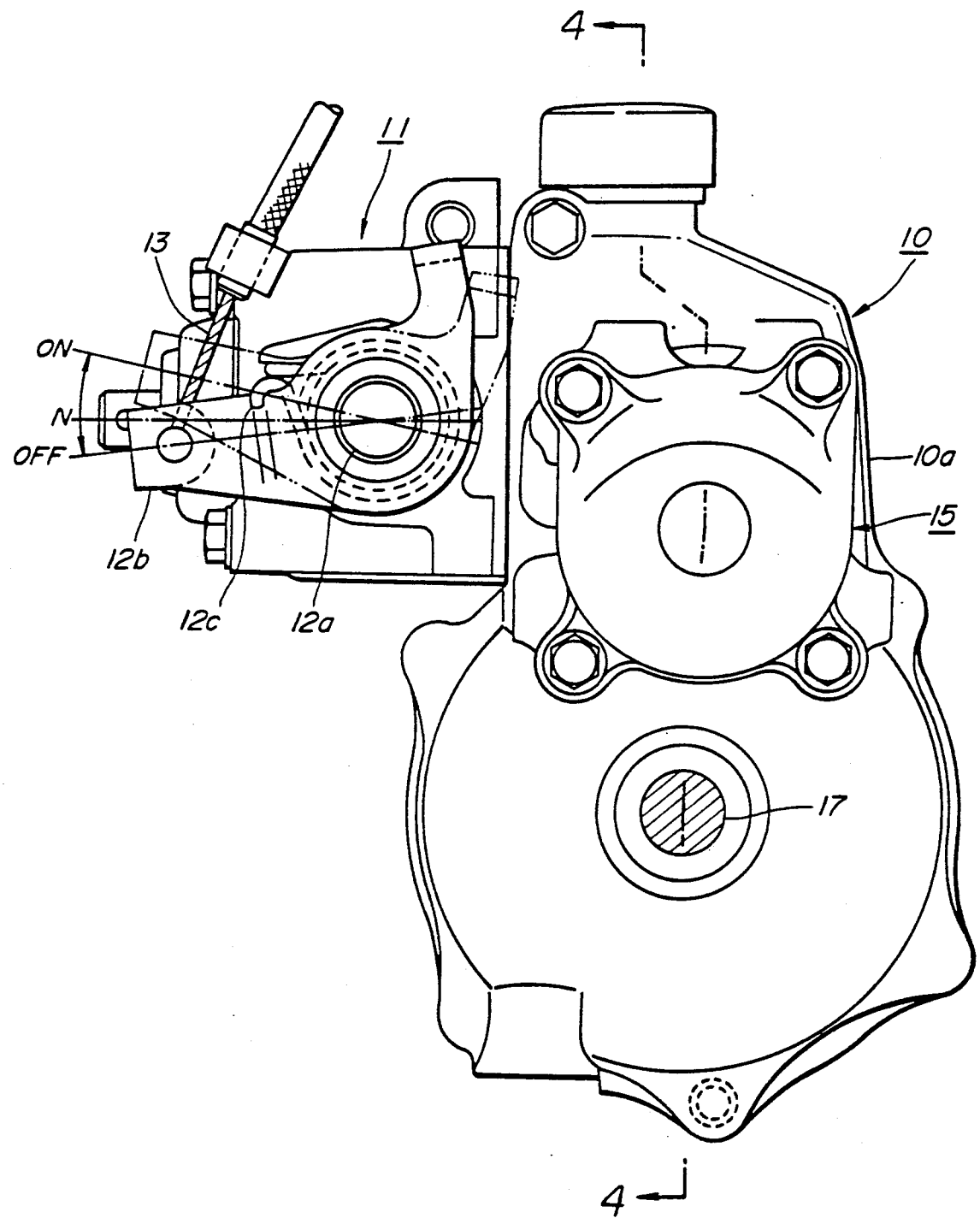
FIG. 2 is a side elevational view of the hydraulic transmission.

As shown in FIG. 2, the hydraulic transmission 10 includes an oil pump 11 disposed in an upper portion thereof, an oil motor 15 disposed in an upper portion thereof and lying perpendicularly to the oil pump 11, and an output shaft 17 disposed in a lower portion thereof.

Figure 3:
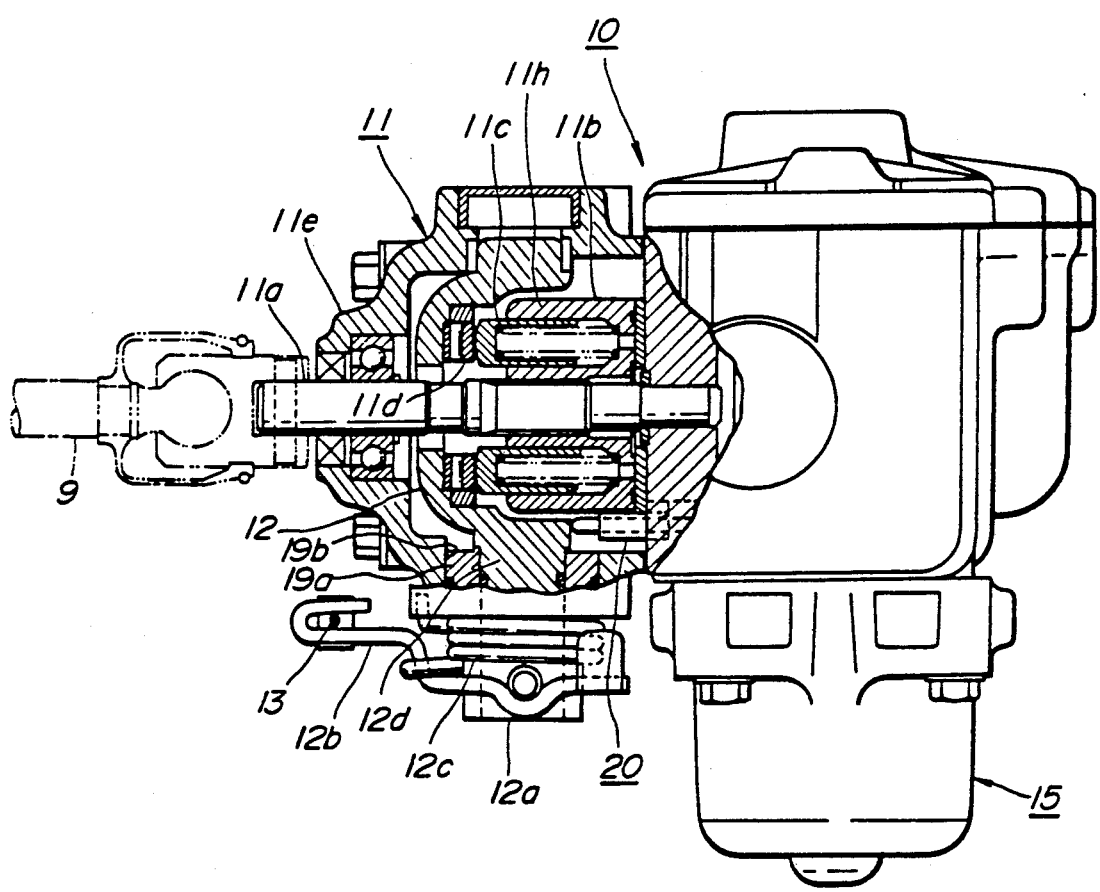
FIG. 3 is a plan view, partly in cross section, of the hydraulic transmission.

As illustrated in FIG. 3, the oil pump 11 is in the form of a variable-displacement axial-piston pump. The oil pump 11 comprises a pump shaft 11a connected to the output shaft of the engine 6 through a coupling shaft 9, a cylinder block 11b splined to the pump shaft 11a, a plurality of pistons 11c axially slidably fitted in respective cylinders 11h defined in the cylinder block 11b, a swash plate 12 held against the tip ends of the pistons 11c through a thrust bearing 11d, and a pump case 11e which houses the pump shaft 11a, the pistons 11c, the cylinder block 11b, and the swash plate 12. The hydraulic transmission 10 also has a directional control valve 20 which has a tip end engageable with the swash plate 12.

The swash plate 12 is rotatably supported in the pump case 11e by a support shaft 12d, which has an end 12a projecting out of the pump case 11e. An arm 12b is attached to the end 12a of the support shaft 12d and has a distal end which engages an end of a wire 13. The arm 12b is normally urged to turn counterclockwise (FIG. 2) by a return spring 12c coiled around the support shaft 12d. When the wire 13 is pulled (i.e., upwardly in FIG. 2), the arm 12b turns clockwise about the shaft end 12a in the direction indicated by the arrow ON against the bias of the return spring 12c. When the wire 13 is loosened, the arm 12b turns counterclockwise under the bias of the return spring 12c.

When the wire 13 is pulled, the swash plate 12 is tilted about the axis of the support shaft 12d to cause the oil pump 11 to discharge oil at a higher rate, resulting in a higher transmission or speed-reduction ratio. When the wire 13 is loosened, the rate at which oil is discharged from the oil pump 11 is lowered, so that the transmission ratio is reduced.

As shown in FIG. 3, the shaft 12d is rotatably supported in a large-diameter hole 19b defined in one end of the pump case 11e, by a bearing collar 19a. The swash plate 12 can be put into the pump case 11e through the hole 19b with the bearing collar 19a removed, and the bearing collar 11e can be installed around the shaft 12d in the hole 19b after the swash plate 12 is inserted. Therefore, the swash plate 12 can easily be assembled into the pump case 11e.

Figure 4:
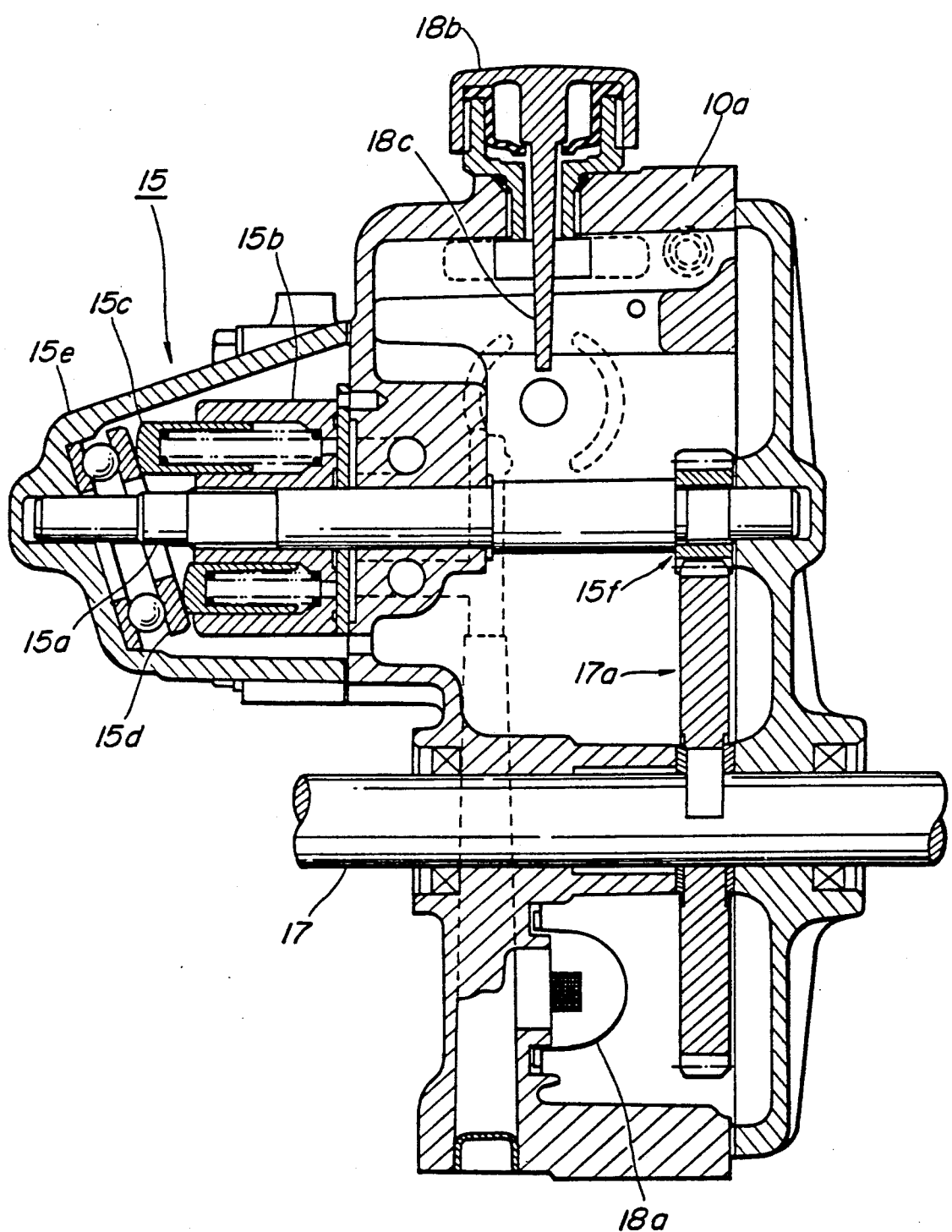
FIG. 4 is a cross-sectional view taken along line 4—4 of FIG. 2.

As illustrated in FIG. 4, the oil motor 15, which is driven by the oil pump 11, is in the form of a fixed-displacement axial-piston motor. The oil motor 15 comprises a motor shaft 15a, a cylinder block 15b splined to the motor shaft 15a, a plurality of pistons 15c axially slidably fitted in respective cylinders defined in the cylinder block 15b, a swash plate 15d held against the tip ends of the pistons 15c, and a motor case 15e which houses the motor shaft 15a, the pistons 15c, the cylinder block 15b, and the swash plate 15d.

The motor shaft 15a has an end projecting to the right from the motor case 15e, and a small-diameter gear 15f is mounted on the projecting end of the motor shaft 15a. The small-diameter gear 15f is held in mesh with a large-diameter gear 17a mounted on an output shaft 17 which extends parallel to the motor shaft 15a. The small- and large-diameter gears 15f, 17a jointly serve as a single-stage speed-reducer gear mechanism, which is housed in a transmission housing 10a of the hydraulic transmission 10, the transmission housing 10a including the pump case 11e and the motor case 15e. The transmission housing 10a sealingly stores oil and doubles as an oil tank of a hydraulic circuit of the hydraulic transmission 10. An oil filter 18a is disposed in the transmission housing 10a. An oil cap 18b is mounted on the transmission housing 10a over an oil inlet, the oil cap 18b having a knife gage or dipstick 18c.

Figure 5:
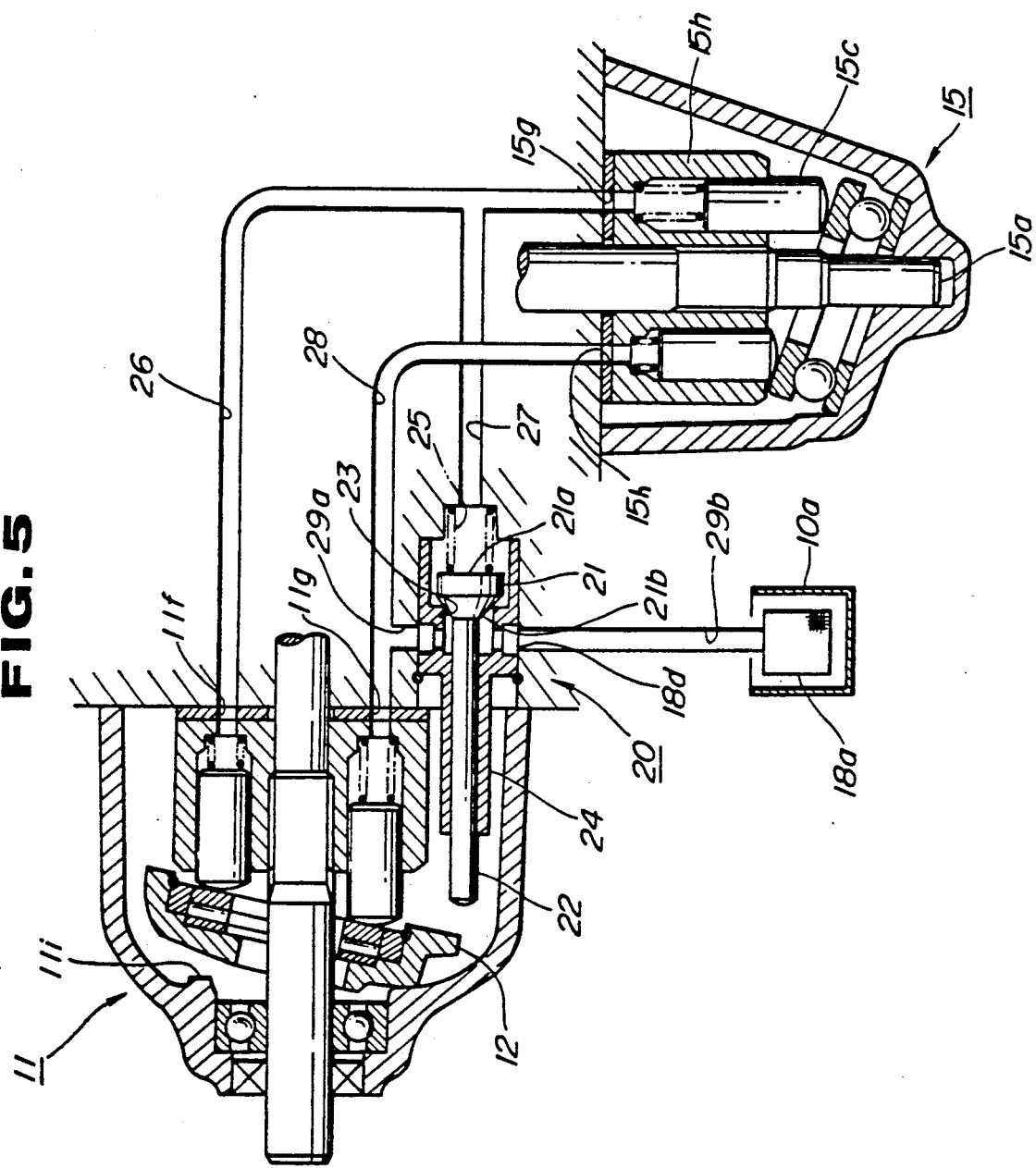
FIG. 5 is a cross-sectional view showing a hydraulic circuit of the hydraulic transmission.

FIG. 5 shows the hydraulic circuit of the hydraulic transmission 10, which hydraulically connects the oil pump 11 and the oil motor 15. The directional control valve 20 comprises a conical valve body 21, a rod 22 integrally extending from the valve body 21, a sleeve 24 having a valve seat 23 and slidably fitted over the rod 22 for guiding the rod 22, and a spring 25 for normally urging the valve body 21 to be pressed against the valve seat 23. When the swash plate 12 is turned into a neutral position shown in FIG. 6a, the rod 22 has its tip end held against the swash plate 12. When the swash plate 12 is further turned from the neutral position into the position shown in FIG. 6b, the rod 22 is axially displaced to the right, unseating the valve body 21 from the valve seat 23 thereby to open the directional control valve 20.

The oil pump 11 has an outlet port 11f which is hydraulically connected to an inlet port 15g of the oil motor 15 by an oil passage 26, from which there is branched an oil passage 27 that is open to a rear surface 21a of the valve body 21 remote from the valve seat 23. The oil pump 11 also has an inlet port 11g which is hydraulically connected to an outlet port 15h of the oil motor 15 by an oil passage 28, from which there is branched an oil passage 29a that is open to a front surface 21b of the valve body 21 on the valve seat side. The oil tank 10a communicates through the filter 18a with an oil passage 29b which is also open to the front surface 21b of the valve body 21. Therefore, the oil passages 26, 28 can selectively be brought into communication with each other by the directional control valve 20 through a bypass oil passageway which comprises the oil passages 27, 29a.

The hydraulic transmission 10 of the above construction operates as follows:

When the swash plate 12 is tilted as shown in FIG. 5, high-pressure oil which is pressurized by the oil pump 11 is delivered through the oil passage 26 and the inlet port 15g of the oil motor 15 into the cylinders 15h. The pistons 15c are therefore projected to rotate the motor shaft 15a through the swash plate 15d. Oil discharged from the cylinders 15h returns through the oil passage 28 into the inlet port 11g of the oil pump 11. Any oil shortage which may be caused by oil leakage or the like is compensated for by the oil supplied from the oil tank 10a through the oil passages 29a, 29b. At this time, the bypass oil passageway composed of the oil passages 27, 29a is not open because the directional control valve 20 is closed. The rotation of the motor shaft 15a is transmitted through the gears 15f, 17a shown in FIG. 4, thereby rotating the output shaft 17 to propel the lawn mower 1.

When the operator releases the clutch lever 8c into the position shown in FIG. 1, the arm 12b is turned in the direction indicated by the arrow OFF in FIG. 2. When the arm 12b is turned into the neutral position N, the swash plate 12 is held substantially perpendicular to the pump shaft 11a as shown in FIG. 6a, and no oil is discharged from the oil pump 11 by the pistons 11c. Therefore, the motor shaft 15a is stopped, and hence the lawn mower 1 is also stopped. Since the oil does not flow through the oil passages at this time, the motor shaft 15a is locked against rotation, and the lawn mower 1 cannot be moved even manually.

When the operator fully releases the clutch lever 8c, the clutch lever 8c swings under the resiliency of the return spring 12c, causing the arm 12b to turn to the OFF position in FIG. 2. At this time, the swash plate 12 swings to the position shown in FIG. 6b until it engages a stopper 11i on the inner surface of the pump case 11e. Simultaneously, the swash plate 12 pushes the rod 22 to the right, unseating the valve body 21 from the valve seat 23. The oil passage 27 now communicates with the oil passages 29a, 29b, whereupon the oil passage 26 communicates with the oil passage 28 and the oil tank 10a. Inasmuch as the inlet port 15g and outlet port 15h of the oil motor 15 are brought into communication with each other, the motor shaft 15a and hence the output shaft 17 can freely rotate. Consequently, the lawn mower 1 is rendered manually movable. Since the swash plate 12 is angularly displaced counterclockwise from the neutral position shown in FIG. 6a, at this time, if the pump shaft 11a is driven by the engine 6, then oil is discharged from the inlet port 11g and drawn into the outlet port 11f. As the inlet and outlet ports 11g, 11f communicate with each other through the directional control valve 20, the oil flows between the inlet and outlet ports 11g, 11f through the directional control valve 20, leaving the output shaft 17 free to rotate.

Figure 7:
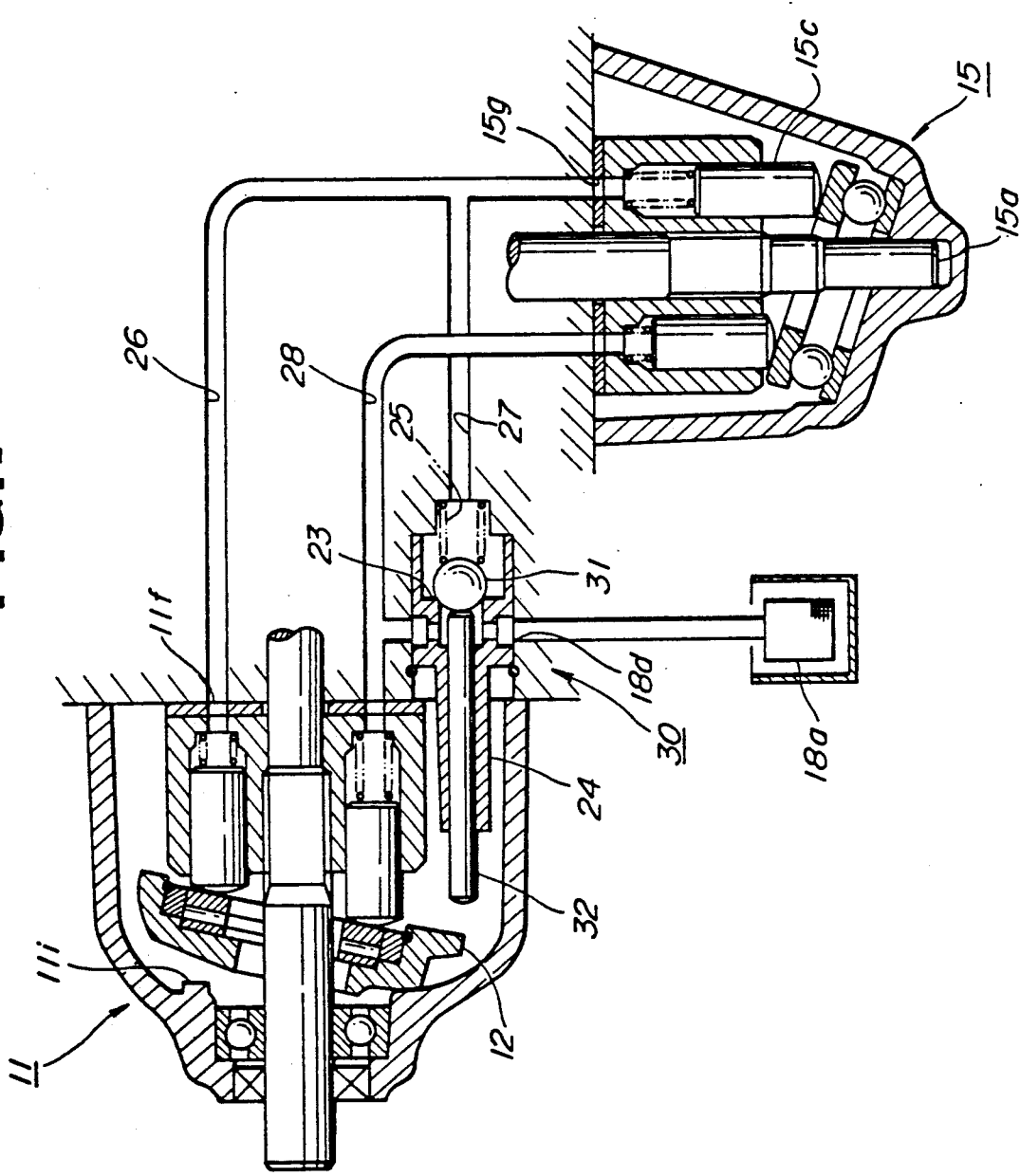
FIG. 7 is a cross-sectional view showing a directional control valve according to another embodiment of the present invention.

FIG. 7 shows a directional control valve 30 according to another embodiment of the present invention. The directional control valve 30 has a ball 31 and a rod 32 which are used in place of the valve body 21 and the rod 22, respectively, of the directional control valve 20 shown in FIG. 5. The ball 31 and the rod 32 are separate from each other. The directional control valve 30 operates in the same manner as the directional control valve 20, but is simpler in construction than the directional control valve 20.

A power-propelled lawn mower according to another embodiment of the present invention will be described below with reference to FIGS. 8 through 13a–13c.

Figure 8:
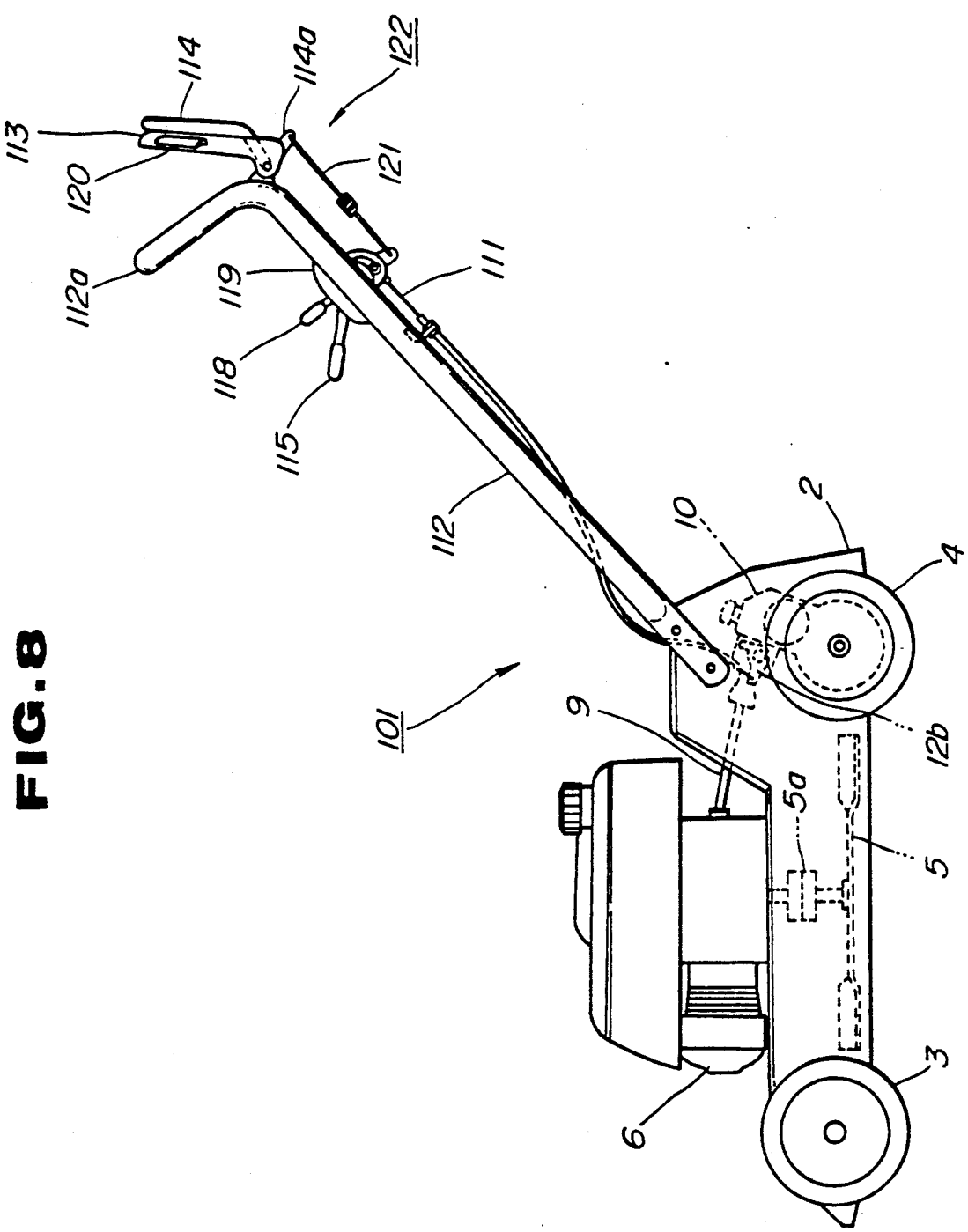
FIG. 8 is a side elevational view of a power-propelled lawn mower according to another embodiment of the present invention.

As shown in FIG. 8, the power-propelled lawn mower, generally designated by the reference numeral 101, has a handle 112 extending rearwardly and upwardly from a rear end of a lower mower body 2. A control lever assembly 122, which includes various control levers, is mounted on an upper portion of the handle 112.

Figure 9:
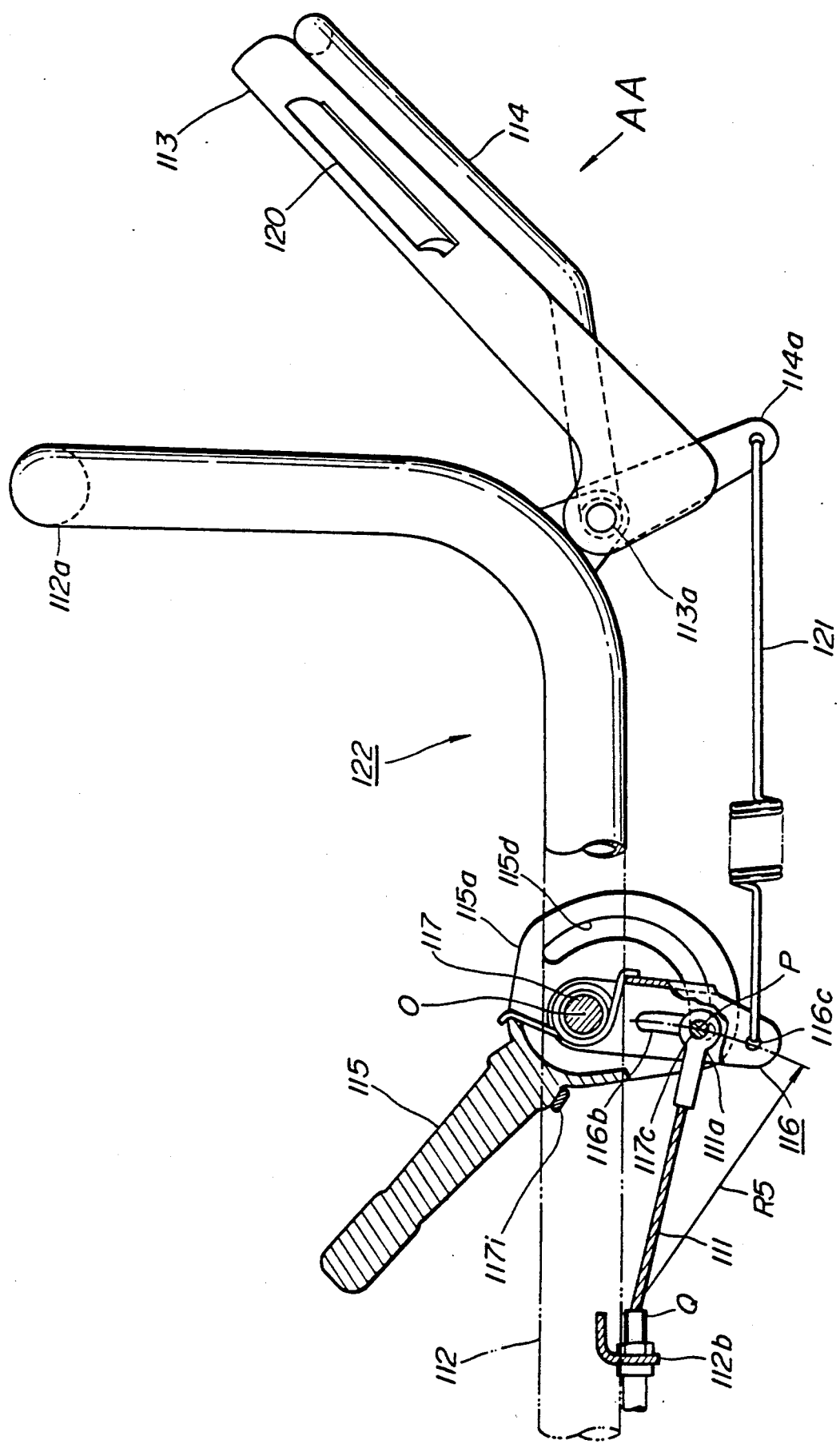
FIG. 9 is an enlarged fragmentary side elevational view of a control lever assembly.

FIG. 9 shows the control lever assembly 122 at an enlarged scale. The handle 112 has on its upper end a handle grip 112a which is bent substantially at a right angle from the rest of the handle 112. The control lever assembly 122 includes a cutter lever 113 and a clutch lever 114 which are swingably supported on the handle 112 near the handle grip 112a by a pivot shaft 113a, and also a transmission shift lever 115 which is swingably supported on the handle 112 by a pivot shaft 117 at a position closer to the lawn mower body 2 than the pivot shaft 113a.

Figure 10:
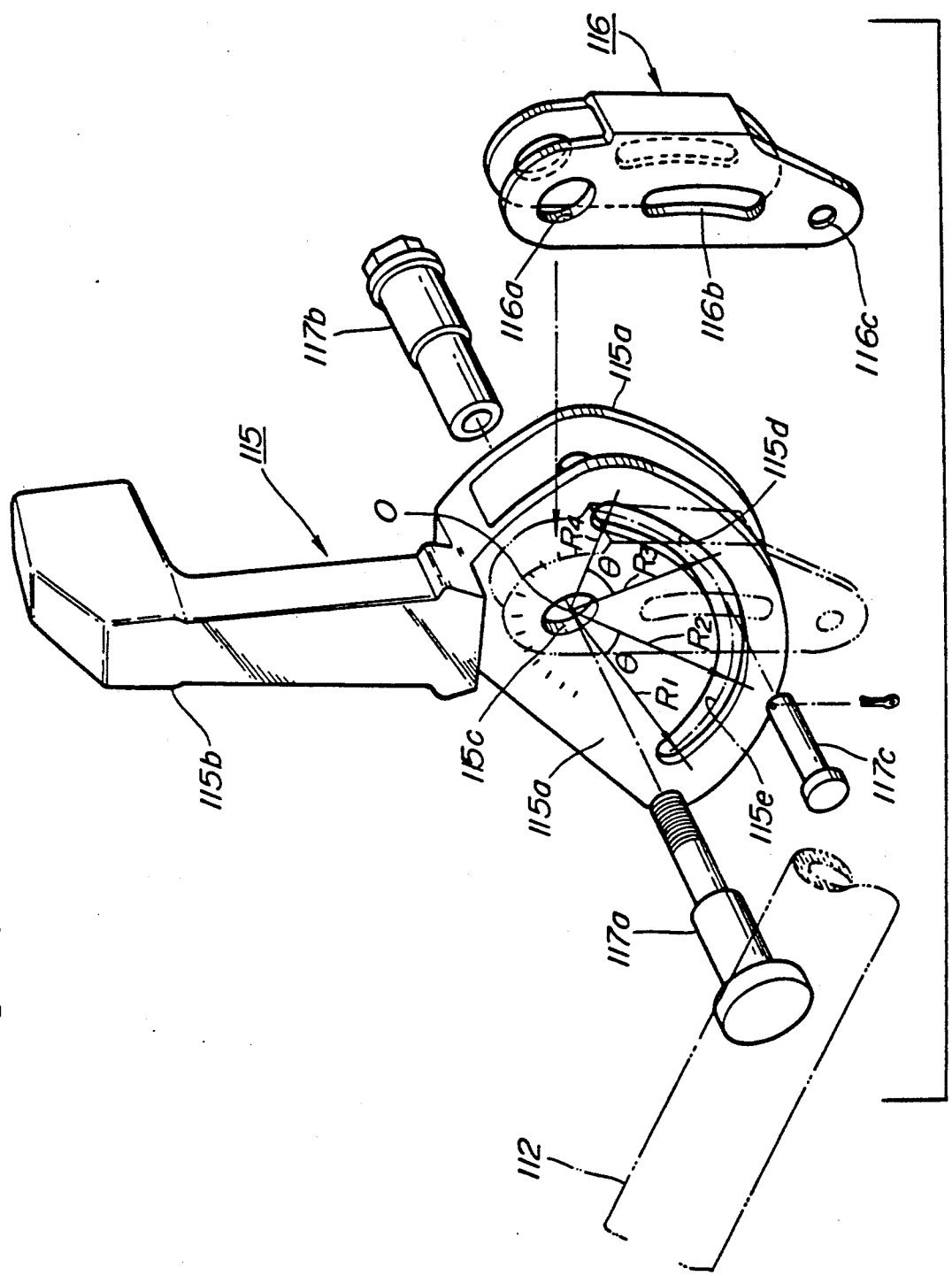
FIG. 10 is an exploded perspective view of a transmission shift lever and a joint lever arm.

In FIG. 10, the transmission shift lever 115 comprises a pair of guide plates 115j joined to each other at upper ends thereof and extending parallel to each other, and a grip 115b projecting from the upper ends of the guide plates 115a. The guide plates 115a have aligned holes 115c defined respectively in upper portions thereof, and curved grooves 115d defined respectively in lower portions thereof around the holes 115c.

A joint lever arm 116 of a channel-shaped cross section is disposed between the guide plates 115a. The guide plates 115a and the joint lever arm 116 are angularly movably coupled to each other by a pivot bolt 117a inserted through the holes 115c and a pivot nut 117b inserted through the holes 115c and a pivot nut 117b threaded over the pivot bolt 117a.

The joint lever arm 116 has a hole 116a defined in an upper portion thereof, a hole 116c defined in a lower portion thereof, and a slightly curved guide groove 116b defined therein between the holes 116a, 116c and extending vertically substantially along a straight line interconnecting the holes 116a, 116c. The pivot bolt 117a extends through the hole 116a. a coupling pin 117c extends through the curved grooves 115d and the guide groove 116b, and is connected to a wire 111 (FIG. 9) through a wire clip 111a on the distal end of the wire 111. The wire 111 is supported on the handle 112 by a wire bracket 112b. The guide groove 116b is of such a configuration that when the operator releases the clutch lever 114, i.e., when the clutch lever 114 is in an OFF position, as shown in FIG. 9, the guide groove 116b is of an arcuate shape having a radius of curvature R5 and a center of curvature Q at the bracket 112b about which the wire 111 is bent. This allows the wire 111 to be pulled out by a constant length when the clutch lever 114 is released no matter which position the transmission shift lever 115 may be shifted in, so that the hydraulic transmission 10 cuts off the transmitted power from the engine thereby stopping the movement of the lawn mower 101. Therefore, the clutch lever 114 functions as a deadman's lever.

As shown in FIG. 10, the curved grooves 115d in the guide plates 115a are shaped such that different distances R1 through R4 from the center O of the holes 115c to the center line 115e of the curved grooves 115d are related as follows: $R1 \geq R2 > R3 > R4$.

The distance R1 is defined as a distance from the center O to the center P of the coupling pin 117c when the transmission shift lever 115 is shifted in a highest-speed position shown in FIG. 13a. The distance R2 is defined as a distance from the center O to the center P when the clutch lever 114 is in an ON position shown in FIG. 13b. In this embodiment, the distances R1, R2 are equal to each other (R1=R2).

When the transmission shift lever 115 coupled to the hydraulic transmission 10 is shifted in a higher-speed position, the force which tends to return the swash plate 12 of the hydraulic transmission 10 toward the neutral position is increased, and hence the transmission shift lever 115 is liable to return to a lower-speed position. Since the distances R1 is equal to the distance R2, the segment of the curved grooves 115d between the angular positions corresponding to the distances R1, R2 is arcuate in shape. Even when the clutch lever 114 is shifted from the OFF position to the ON position, the transmission shift lever 115 in the highest-speed position is not liable to return to the lower-speed position. The transmission or speed-reduction ratio remains substantially constant even when the clutch lever 114 is repeatedly shifted between the ON and OFF positions with the transmission shift lever 115 in a higher-speed position.

The distance R3 is defined as a distance from the center 0 to the center P when the clutch lever 114 is in the OFF position with the transmission shift lever 115 in the lowest-speed position. The distance R4 is defined as a distance from the center 0 to the center P when the clutch lever 114 is in the ON position with the transmission shift lever 115 in the lowest-speed position.

Figure 11:
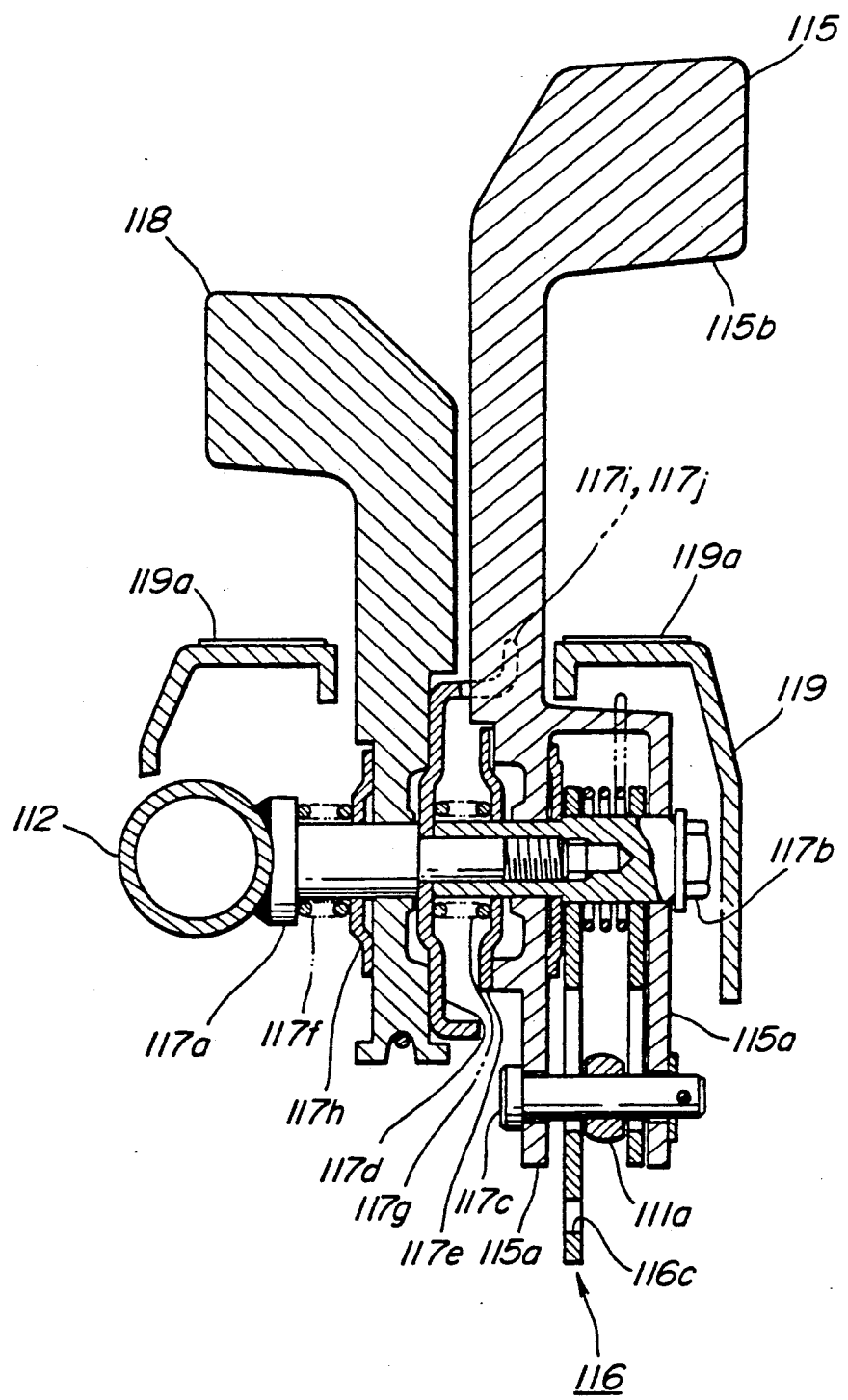
FIG. 11 is a cross-sectional view of a portion of the control lever assembly.

FIG. 11 shows the transmission shift lever 115 in cross section. The pivot bolt 117a is secured to one side of the handle 112, and the pivot bolt 117a and the pivot nut 117b lie horizontally. Between the pivot bolt 117a and the pivot nut 117b, there are interposed a throttle lever 118 which adjusts the rotational speed of the engine, a bracket 117d, spring seats 117e, 117h, the transmission shift lever 115, and the joint lever arm 116.

The throttle lever 118 is pressed against the bracket 117d by a spring 117f engaging the spring seat 117h, and the spring seat 117e is pressed against one of the guide plates 115a by a set spring 117g acting between the bracket 117d and the spring seat 117e. The spring seat 117e has sawteeth which mesh with serrations on the guide plate 115a, so that the transmission shift lever 115 can be fixed in any selected angular position.

The bracket 117d has bent stoppers 117i, 117j on upper front and rear ends thereof spaced from each other. The stoppers 117i, 117j are engageable with the transmission shift lever 115 to limit the range of angular movement thereof.

A cover 119 is fixed to the bracket 117d, and a graduated panel 119a is attached to an upper surface of the cover 119. The graduations of the graduated panel 119a are indicative of positions of the transmission shift lever 115 and the throttle lever 118.

Figure 12:
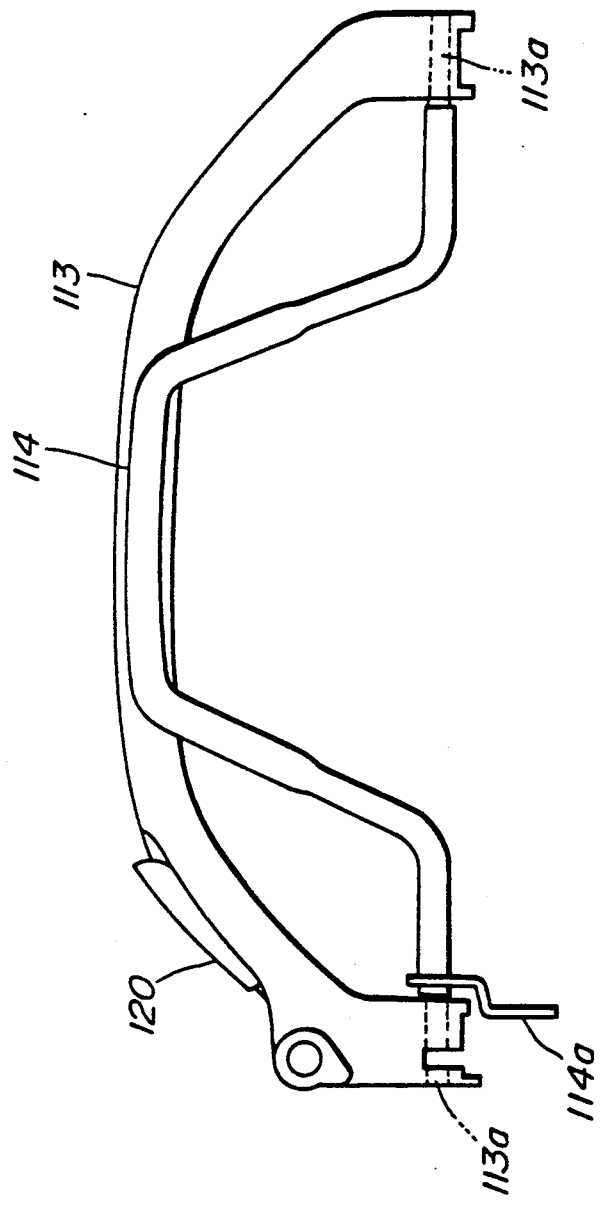
FIG. 12 is a view of the control lever assembly as viewed in the direction of the arrow AA in FIG. 9, and FIGS. 13a, 13b, and 13c are views showing how the control lever assembly operates.

As shown in FIGS. 9 and 12, the cutter lever 113 is of an arch shape and is partly similar in shape to the handle grip 112a. The cutter lever 113 is positioned closer to the operator than the handle grip 112a, and the clutch lever 114 is positioned closer to the operator than the cutter lever 113. Therefore, when the operator grips the clutch lever 114 and turns the same toward the handle grip 112a, the cutter lever 113 can also be moved with the clutch lever 114 toward the handle grip 112a. However, the operator may grip the cutter lever 113 alone to turn the same. A cutter clutch lever 120 is movably mounted in a lefthand portion (FIG. 12) of the cutter lever 113, and operatively connected to a cutter clutch 5a (FIG. 8). When the operator turns the cutter lever 113 while griping the cutter clutch lever 120, the cutter clutch 5a is engaged to operate the cutter 5. When the operator turns the cutter lever 113 without gripping the cutter clutch lever 120, the cutter clutch 5a remains disengaged, and the cutter 5 is not operated.

As shown in FIGS. 8 and 9, the wire 111 extends from the arm 12b and is radially positioned with respect to the handle 112 by the bracket 112b. In FIG. 9, the lower portion of the joint lever arm 116 is connected to a swing member 114a on a lower end of the clutch lever 114 through a tension spring 121, which has one end engaging in the hole 116c in the joint lever arm 116 and the other end engaging in a hole defined in the swing member 114a. When the clutch lever 114 is turned, the coupling pin 117c slides along the grooves 116b, 115d.

The cutter lever 113, the clutch lever 114, the transmission shift lever 115, the joint lever arm 116, the throttle lever 118, and the cutter clutch lever 120 jointly constitute the control lever assembly 122.

The transmission shift lever 115 serves to change the stroke by which the wire 111 moves to tilt the swash plate of the hydraulic transmission, for thereby changing the transmission or speed-reduction ratio. The clutch lever 114 serves to short-circuit or open the hydraulic circuit for allowing the lawn mower 101 to move manually. The cutter lever 113 serves in combination with the cutter clutch lever 120 to engage or disengage the clutch 5a which is operatively coupled between the engine 6 and the grass cutter 5.

Operation of the control lever assembly 122 will be described with reference to FIGS. 13a through 13c.

As shown in FIG. 13a, the operator turns the transmission shift lever 115 into the highest-speed position until it abuts against the stopper 117i.

In FIG. 13a, since the clutch lever 114 is released, the wire 111 is pulled toward the hydraulic transmission 10 under the bias of the return spring of the hydraulic transmission 10. The clutch mechanism of the hydraulic transmission 10 is turned off, so that the rotative power from the engine 6 is not transmitted to the drive wheels of the lawn mower 101.

Then, the operator grips the cutter clutch lever 120 and turns the clutch lever 114 and the cutter lever 113 to the handle grip 112a, as shown in FIG. 13b. The swing member 114a on the lower end of the clutch lever 114 now causes the tension spring 121 to draw the lower portion of the joint lever arm 116. The coupling pin 117c is now moved along the curved grooves 115d and the guide groove 116b in the direction indicated by the arrow A, tilting the arm 12b in the direction indicated by the arrow B.

Figure 13C:
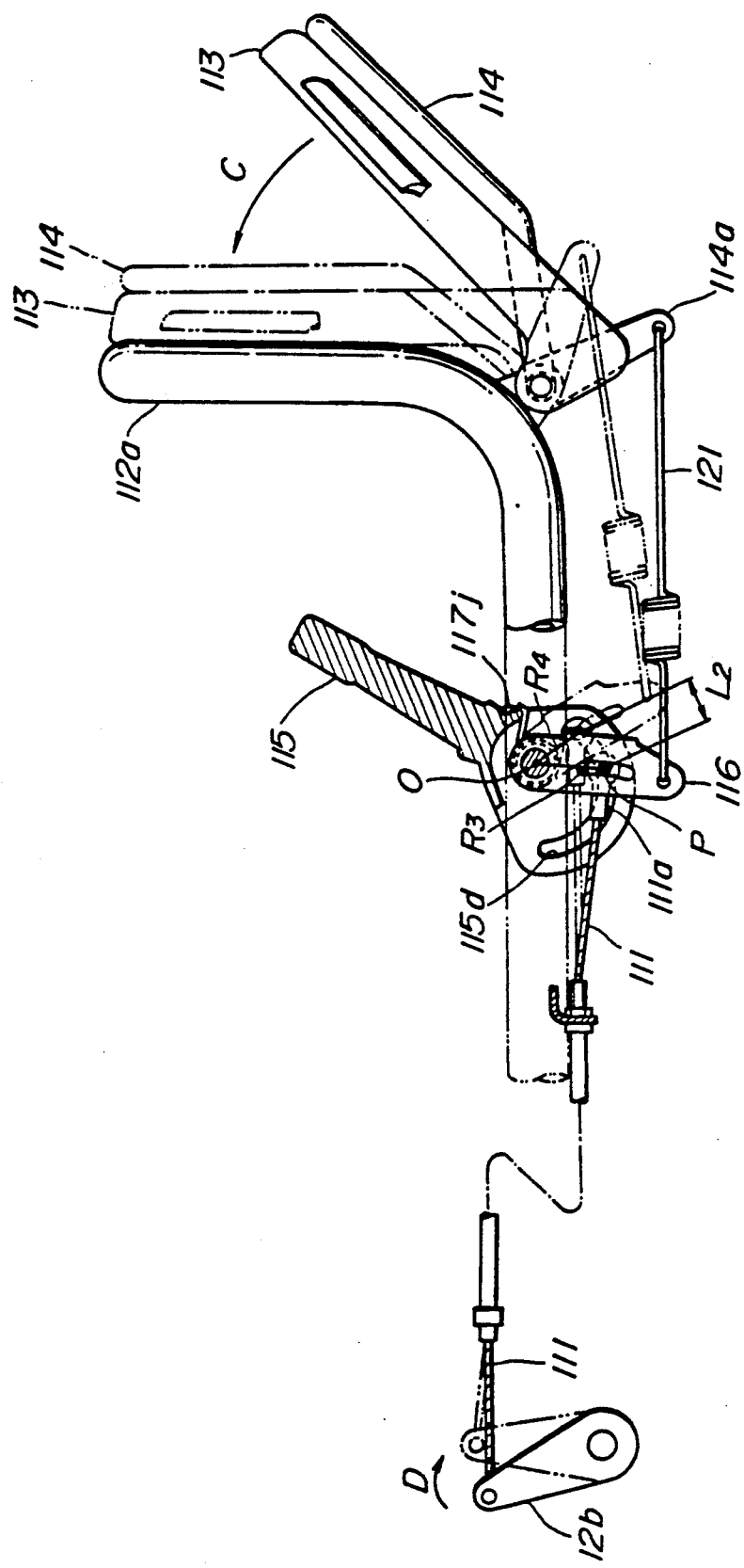

In FIG. 13c, the operator turns beforehand the transmission shift lever 115 into the lowest-speed position until it engages the stopper 117j. When the operator displaces the clutch lever 114 toward the handle grip 112a in the direction indicated by the arrow C, the coupling pin 117c is moved along the grooves 115d, 116b, tilting the arm 12b in the direction indicated by the arrow D.

Since the distances R1, R2, R3, R4 or the radii of curvature of the grooves 115d are selected such that R1≧R2 >R3>R4, as described above the stroke L1 (FIG. 13b) by which the wire 111 is displaced when the transmission shift lever 115 is shifted into the highest-speed position is greater than the stroke L2 (FIG. 13c) by which the wire 111 is displaced when the transmission shift lever 115 is shifted into the lowest-speed position (L1>L2). Therefore, the transmission ratio of the hydraulic transmission 101 varies depending on the angular position in which the transmission shift lever 115 is tilted.

The clutch lever 114 can easily be operated since it can be brought into the ON and OFF positions freely without regard to the position to which the transmission shift lever 11 is shifted.

When grass is to be clipped while the lawn mower 101 is not being propelled by power, i.e., while the lawn mower 101 is being held at rest, or while the lawn mower 101 is being manually pushed, the clutch lever 114 should not be turned, but only the cutter lever 113 should be turned while the cutter clutch lever 120 is being gripped. When the lawn mower 101 is to be propelled by power without clipping grass, the cutter clutch lever 120 should not be gripped, but the clutch lever 114 and the cutter lever 113 should be turned together.

The control lever assembly 122 may be employed not only in power-propelled lawn mowers but also in power-propelled working machines such as snowplows, cultivators, or the like.

With the present invention, as described above, the directional control valve is completely accommodated in the transmission housing, and can be operated by the swash plate which is also accommodated in the transmission housing. Therefore, the directional control valve is protected from entry of dust or other foreign matter, without the need for any special dust-prevention arrangements. Since the directional control valve automatically operates when the hydraulic transmission is shifted beyond the neutral position, no additional mechanism is required to operate the directional control valve. Accordingly, the mechanism for operating the directional control valve is relatively simple and small.

The transmission mechanism and the clutch mechanism can selectively be operated through the single wire by the transmission shift lever and the clutch lever, respectively. Therefore, the control lever assembly is relatively simple and can be efficiently and smoothly operated.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A hydraulic transmission comprising:
    an oil pump having an inlet port and an outlet port;
    an oil motor having an inlet port and an outlet port and drivable by said oil pump;
    a transmission ratio control member displaceably mounted in one of said oil pump and said oil motor, for varying a transmission ratio of the hydraulic transmission between a higher-speed position, a lower-speed position, and a neutral position;
    a first oil passage hydraulically interconnecting the outlet port of said oil pump and the inlet port of said oil motor;
    a second oil passage hydraulically interconnecting the inlet port of said oil pump and the outlet port of said oil motor;
    a housing accommodating said oil pump, said oil motor, said first oil passage, and said second oil passage; and
    oil passage control means for selectively bringing said first oil passage into and out of hydraulic communication with said second oil passage, said oil passage control means being fully accommodated in said housing and actuatable by said transmission ratio control member to bring said first and second oil passages into hydraulic communication with each other only when said transmission ratio control member is near said neutral position.

2. A hydraulic transmission according to claim 1, wherein said oil passage control means comprises a bypass oil passageway communicating between said first and second oil passages, and a directional control valve disposed in said bypass oil passageway.

3. A hydraulic transmission according to claim 2, wherein said transmission ratio control member has means for engaging and pushing said directional control valve until the directional control valve is forcibly opened when the transmission ratio control member is near said neutral position.

4. A hydraulic transmission according to claim 3, wherein said oil pump comprises a variable-displacement axial-piston pump having a swash plate, and said oil motor comprises a fixed-displacement axial-piston motor, said transmission ratio control member comprising said swash plate.

5. A hydraulic transmission according to claim 1, further comprising an oil tank and a third oil passage, said third oil passage communicating between said oil tank and the inlet port of said oil pump.

6. A hydraulic transmission according to claim 5, wherein said oil tank is defined by said housing.

* * * * *

UNITED STATES PATENT AND TRADEMARK OFFICE
CERTIFICATE OF CORRECTION

PATENT NO. : 5,094,078

DATED : March 10, 1992

INVENTOR(S) : Sadanori Nishimura; Kichiji Misawa; Tomoaki Ishikawa; and Masae Takamizawa It is certified that error appears in the above-identified patent and that said Letters Patent is hereby corrected as shown below:

```
Column 4, line 18, change "11e" to -- 19a --.
Column 6, line 36, change "115j" to -- 115a --;
          line 48, delete the entire line;
          line 56, change "116a.  a" to -- 116a.  A --.
Column 7, line 58, change "sawteeth" to -- saw teeth --.
Column 9, line 24, change "11" to -- 115 --.
```

Signed and Sealed this

Fourth Day of May, 1993

Attest:

MICHAEL K. KIRK

*Attesting Officer*  Acting Commissioner of Patents and Trademarks